US010684686B1

(12) United States Patent
Milstein

(10) Patent No.: US 10,684,686 B1
(45) Date of Patent: Jun. 16, 2020

(54) DYNAMIC COMMAND REMAPPING FOR HUMAN-COMPUTER INTERFACE

(71) Applicant: INTREEG, Inc., Boston, MA (US)

(72) Inventor: Daniel Jonathan Milstein, Boston, MA (US)

( * ) Notice: Subject to any disclaimer, the term of this patent is extended or adjusted under 35 U.S.C. 154(b) by 0 days.

(21) Appl. No.: 16/458,443

(22) Filed: Jul. 1, 2019

(51) Int. Cl.
*G06F 3/01* (2006.01)
*G06F 3/14* (2006.01)

(52) U.S. Cl.
CPC .............. *G06F 3/015* (2013.01); *G06F 3/14* (2013.01)

(58) Field of Classification Search
CPC ............. G06F 3/015; G06F 3/0487–04897
See application file for complete search history.

(56) References Cited

U.S. PATENT DOCUMENTS

| | | | |
|---|---|---|---|
| 7,546,158 B2 | 6/2009 | Allison et al. | |
| 8,581,856 B2* | 11/2013 | Benko | G06F 3/005 178/18.01 |
| 9,299,248 B2* | 3/2016 | Lake | G08C 17/02 |
| 9,389,685 B1 | 7/2016 | Pathirage et al. | |
| 10,126,816 B2 | 11/2018 | Segal | |
| 2005/0131311 A1* | 6/2005 | Leuthardt | A61F 4/00 600/545 |
| 2012/0090003 A1* | 4/2012 | Dove | H04N 21/42201 725/38 |
| 2012/0101402 A1* | 4/2012 | Nguyen | A61B 5/7264 600/544 |
| 2013/0211843 A1* | 8/2013 | Clarkson | G06F 3/017 704/275 |
| 2015/0091790 A1* | 4/2015 | Forutanpour | G06F 3/011 345/156 |
| 2016/0103487 A1 | 4/2016 | Crawford et al. | |
| 2019/0079647 A1* | 3/2019 | Vukicevic | G06K 9/00677 |
| 2019/0124387 A1* | 4/2019 | Baron | G06F 3/147 |

OTHER PUBLICATIONS

Blankertz, Benjamin, et al. "The Berlin Brain-Computer Interface presents the novel mental typewriter Hex-o-Spell." (2006): 108-109 (2 pages).
Cao, Lei, et al. "A synchronous motor imagery based neural physiological paradigm for brain computer interface speller." Frontiers in human neuroscience 11 (2017): 274 (9 pages).
D'albis, Tiziano, et al. "A predictive speller controlled by a brain-computer interface based on motor imagery." ACM Transactions on Computer-Human Interaction (TOCHI) 193 (2012): 1-25 (25 pages).

* cited by examiner

*Primary Examiner* — Michael Pervan
(74) *Attorney, Agent, or Firm* — Mintz Levin Cohn Ferris Glovsky and Popeo, P.C.; Peter F. Corless

(57) ABSTRACT

Methods can include: activating a human-computer interface (HCI), such as a brain-computer interface (BCI) or a muscle-computer interface (muCI), through which a computing device is in operative communication with a brain or one or more muscles of a user; defining a command mapping according to which operation of the computing device is configured to be controlled through the HCI based on at least one electric signal of the user measured via one or more sensors coupled to the user; detecting an operation context of the computing device during operation of the computing device; and remapping the command mapping based on the detected operation context during operation of the computing device. The operation of the computing device can then be controlled through the HCI based on the at least one measured electric signal according to the remapped command mapping.

38 Claims, 10 Drawing Sheets

| | Left foot | Right foot | Both feet | Left hand | Right hand | Both hands | Tongue | Stomach |
|---|---|---|---|---|---|---|---|---|
| Left foot | MAIN APP MENU | PRESS ENTER | EXIT TEXT BOX | CAPS LOCK | A | B | C | D |
| Right foot | E | F | G | H | I | J | K | L |
| Both feet | M | N | O | P | Q | R | S | T |
| Left hand | U | V | W | X | Y | Z | 0 | 1 |
| Right hand | 2 | 3 | 4 | 5 | 6 | 7 | 8 | 9 |
| Both hands | BACK SPACE | SPACE | mango lassi | mango sticky rice | mango grove | mango groove | mango fly | mango ice cream |
| Tongue | mango chutney | mango worm | mango protocol | mango tilapia | mango oi | mango TV | mango pickle | Mango City |
| Stomach | mango festival | The Mango Tree | mango pudding | mango allergy | mango juice | mango salsa | mango smoothie | mango languages |

FIG. 3B

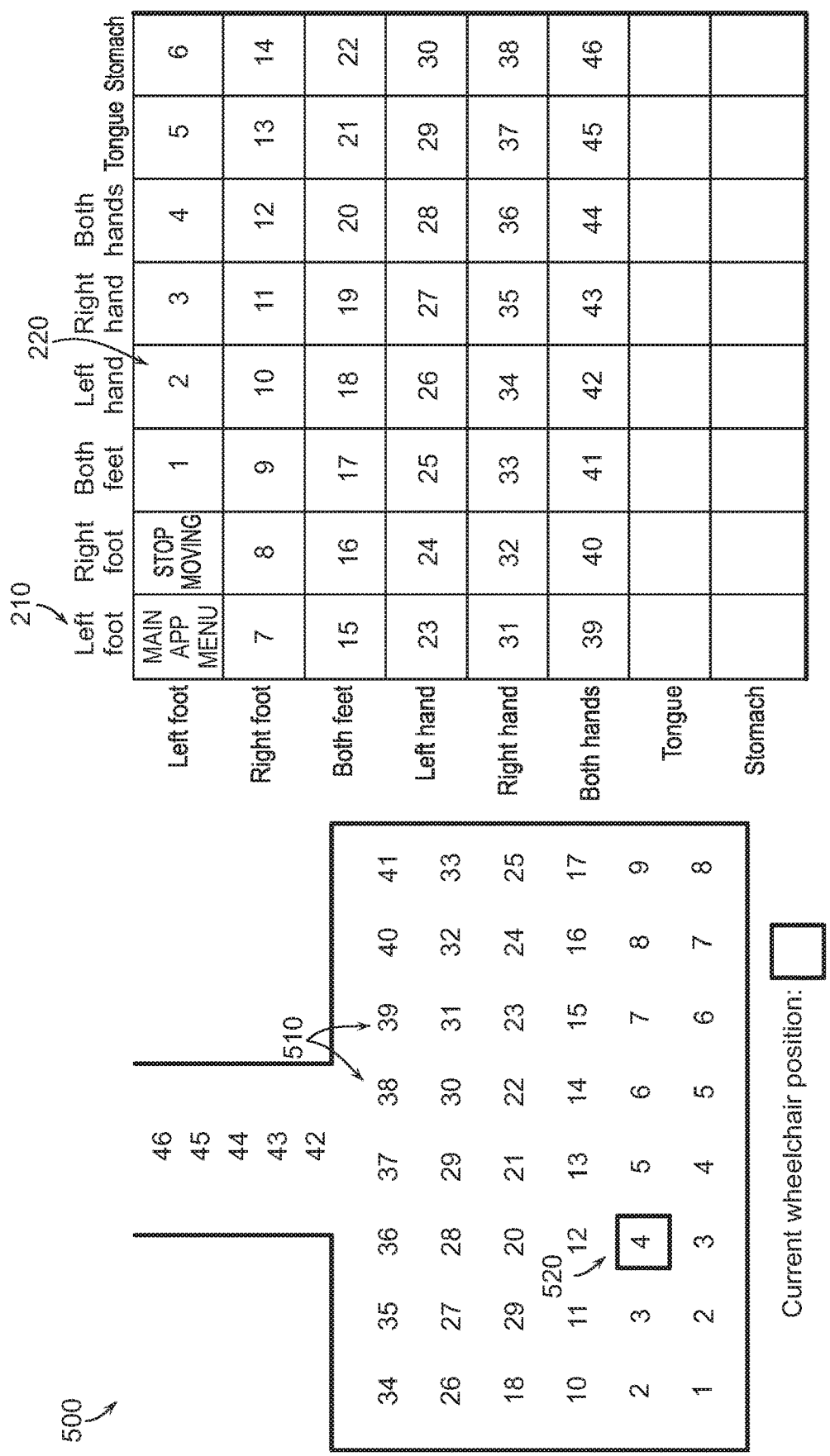

FIG. 6

|  | Left foot | Right foot | Both feet | Left hand | Right hand | Both hands | Tongue | Stomach |
|---|---|---|---|---|---|---|---|---|
| Left foot | A | B | C | D | E | F | G | H |
| Right foot | I | J | K | L | M | N | O | P |
| Both feet | Q | R | S | T | U | V | W | X |
| Left hand | Y | Z | 0 | 1 | 2 | 3 | 4 | 5 |
| Right hand | 6 | 7 | 8 | 9 | SPACE | ENTER | UNDO | EXIT PROGRAM |
| Both hands | ; | : | " | . | ! | ( | ) | / |
| Tongue | \ | - | _ | , | ~ | < | > | @ |
| Stomach | MORE SYMBOLS | CHANGE EMAIL SUBJECT | CHANGE EMAIL RECIPIENT | Susan.Chen@email.com | Bob.Jonas@email.com | Stacey.West@email.com | TOGGLE ITALICS | SEND EMAIL |

DYNAMIC COMMAND REMAPPING FOR HUMAN-COMPUTER INTERFACE

TECHNICAL FIELD

The present disclosure relates generally to human-computer interfaces (HCIs) through which a computing device is in operative communication with a brain or muscles of a user, and more particularly, to systems and methods for dynamically remapping a command mapping in an HCI-enabled computing device.

BACKGROUND

People with quadriplegia or other similar types of paralysis suffer from a partial or total loss of limb control. Often due to injury to the brain or spinal cord, quadriplegia can severely limit one's interactions with others, as well as professional opportunities, access to information, recreation, and self-care. Individuals with complete paralysis additionally lack the ability to effectively communicate, thus restricting a fundamental capability of human beings.

Recently, assistive technologies have enabled quadriplegics to perform certain activities, such as communication, which might be otherwise impossible. One such example, a brain-computer interface (BCI), which refers to a communication pathway between a user's brain and an external device, can allow the user to control a computer with mere thought through the interpretation of brain signals. A BCI-enabled device can utilize a user's brain signals, measured using brain sensors of various types (e.g., electroencephalography (EEG), magnetoencephalography (MEG), functional magnetic resonance imaging (fMRI), electrocorticography (ECoG), etc.), as input to control operation of the device. As such, BCIs can restore communicative abilities for quadriplegics, among other possible opportunities, so as to significantly improve quality of life. Similar to the BCI, a muscle-computer interface (muCI) refers to a communication pathway between a user's muscle and an external device, allowing the user to control a computer with muscle activity, e.g., residual muscle activity after the user has suffered a debilitating accident, through the interpretation of muscle signals.

However, existing BCI-based technologies suffer from a variety of drawbacks including significant costs, safety concerns, and slow communication rates. For instance, BCIs with the fastest recorded typing rate require a brain implant, which in turn requires potentially dangerous and very expensive neurosurgery. These invasive BCIs allow for computer control of a traditional cursor, but rely on computer applications written for able-bodied users, which are not optimized for the fine-motor limitations of neurally controlled cursors. Meanwhile, state-of-the-art non-invasive BCIs can be safe and relatively inexpensive, but provide a dramatically slower typing speed due to reduced signal quality.

At the root of BCI applications is the measurement and interpretation of a user's brain signals. Some systems for interpreting brain signals rely on learning a correspondence between the raw electrical signal measured from neural activity in the brain and a thought or sequence of thoughts through a series of examples. For instance, a user whose brain is coupled to sensors might be asked to think about one of a small set of thought patterns, such as imagining moving his or her left arm, several dozen times for each pattern. From those examples, the system can train a mathematical model of the signals corresponding to each thought pattern.

Problematically, brain signals can be highly non-stationary, causing the nature of the signals to change frequently. This necessitates frequent retraining of the model with new examples, a process which takes considerable time. In order to limit retraining time, the number of thought patterns recognized by the system must be limited. Thus, a quadriplegic user attempting to operate a BCI-enabled device may encounter a time-consuming process of constant model retraining on one hand, or a limited suite of system-recognizable operations on the other.

Of course, most modern computer devices have installed thereon multiple different software applications such as a web browser, music player, instant messenger, word processor, and so on. Across the various applications, a user may need to perform one of potentially thousands of operations. Moreover, operations applicable to a first application may be inapplicable to a second application. Therefore, a challenge exists in mapping a fixed set of thoughts or thought sequences to a constantly changing suite of application-specific operations.

SUMMARY

The present disclosure provides systems and methods for dynamically remapping a command mapping in an HCI-enabled device. The command mapping can correlate user actions such as particular types of thought (referred to herein as "thought variants") or sequences thereof, or particular types of muscle activity (referred to herein as "muscle activity variants") or sequences thereof, with particular commands executable by the computing device. Brain activity can be detected through analysis of brain signals measured via brain sensors coupled to the user's brain. Likewise, muscle activity can be detected through analysis of muscle signals measured via muscles sensors coupled to one or more of the user's muscles.

When a context of the computing device (referred to herein as an "operation context") changes, the command mapping can also change to reflect the new operation context, such that the changed, or remapped, command mapping correlates the aforementioned thought variants or muscle activity variants with one or more different commands executable by the computing device relevant to the new operation context. In other words, the command mapping can be dynamically remapped in response to a change in the operation context of the computing device, providing for context-specific command mappings and improved control of HCI-enabled devices.

According to embodiments of the present disclosure, a method can include: activating a brain-computer interface (BCI) through which a computing device is in operative communication with a brain of a user; defining a thought-command mapping according to which operation of the computing device is configured to be controlled through the BCI based on at least one brain signal of the user measured via one or more brain sensors coupled to the brain of the user, the thought-command mapping defining a plurality of thought variants each of which corresponding a command executable by the computing device, a first thought variant among the plurality of thought variants corresponding to a first command executable by the computing device; detecting an operation context of the computing device during operation of the computing device; and remapping the thought-command mapping based on the detected operation context during operation of the computing device such that the first thought variant corresponds to a second command executable by the computing device different from the first command. In response to the remapping of the thought-command mapping, the operation of the computing device can be configured to be controlled through the BCI based on the at least one measured brain signal according to the remapped thought-command mapping.

The method may further include: measuring the brain signal of the user using one or more brain sensors coupled to a brain of the user; sensing a thought variant based on signal analysis of the measured brain signal; determining a command executable by the computing device corresponding to the sensed thought variant according to the remapped thought-command mapping; and controlling the computing device so as to execute the determined command.

The thought-command mapping can be remapped in response to detecting a change of the operation context during operation of the computing device.

The operation context of the computing device can be associated with at least one of an application currently executing on the computing device, an external event occurring while the computing device is actively operating, and a user history associated with the computing device.

The method may further include: when an application currently executing on the computing device is a non-BCI-enabled application, dividing a screen area of the application into a plurality of cells each of which including a specific region of the screen area, whereby each of the plurality of thought variants can correspond to a particular cell of the plurality of cells according to the thought-command mapping.

The method may further include: detecting a first application currently executing on the computing device, the thought-command mapping being a first thought-command mapping corresponding to the first application.

The method may further include: in response to a second application different from the first application being launched on the computing device, remapping the thought-command mapping such that the remapped thought-command mapping is a second thought-command mapping corresponding to the second application, the second thought-command mapping different from the first thought-command mapping.

The method may further include: in response to a detection of a user action performed in the first application, remapping the thought-command mapping such that the remapped thought-command mapping is a second thought-command mapping based on the detected user action, the second thought-command mapping different from the first thought-command mapping.

The method may further include: in response to a detection of an external event occurring during the execution of the first application, remapping the thought-command mapping such that the remapped thought-command mapping is a second thought-command mapping based on the detected external event, the second thought-command mapping different from the first thought-command mapping. The external event can be detected when the computing device receives an incoming electronic message. Also, the external event can be detected when the computing device detects a change of a location of the user. Such external events are merely provided as examples and do not limit the scope of the present disclosure thereto.

The method may further include: in response to a detection of a user history associated with the first application, remapping the thought-command mapping such that the remapped thought-command mapping is a second thought-command mapping based on the detected user history, the second thought-command mapping different from the first thought-command mapping. The user history can be associated with at least one of contacts of the user, previously used words or phrases, and previously executed commands. Such items with which the user history can be associated are merely provided as examples and do not limit the scope of the present disclosure thereto.

The method may further include: controlling a display unit of the computing device so as to simultaneously display an application currently executing on the computing device and an image characterizing the thought-command mapping. The application currently executing on the computing device can be displayed in a first screen area of the display unit, and the image characterizing the thought-command mapping is displayed in a second screen area of the display unit. The image characterizing the thought-command mapping can indicate each of the plurality of thought variants and each command executable by the computing device to which each of the plurality of thought variants corresponds. Also, the image characterizing the thought-command mapping can include a grid showing a correspondence between the plurality of thought variants and each command executable by the computing device.

The method may further include: detecting a first application currently executing on the computing device, the thought-command mapping being a first thought-command mapping corresponding to the first application; controlling a display unit of the computing device so as to display an image characterizing the first thought-command mapping; in response to a second application different from the first application being launched on the computing device, remapping the thought-command mapping such that the remapped thought-command mapping is a second thought-command mapping corresponding to the second application, the second thought-command mapping different from the first thought-command mapping; and controlling the display unit so as to update the displayed image such that the displayed image characterizes the second thought-command mapping.

The thought-command mapping can include a multi-length mapping scheme in which a first thought variant among the plurality of thought variants followed by one or more subsequent thought variants among the plurality of thought variants corresponds to a command executable by the computing device.

The plurality of thought variants can include thoughts of a particular body part, thoughts of a particular sound or word, thoughts of a particular image, thoughts of a particular object visible to the user, motor imagery, or any combination thereof.

Furthermore, in accordance with embodiments of the present disclosure, a system can include: one or more brain sensors configured to be coupled to a brain of a user and to measure a brain signal of the user; and a computing device including a memory configured to store at least one program instruction and a processor configured to execute the at least one program instruction, the computing device in operative communication with the brain of the user through a brain-computer interface (BCI). The processor can be configured to: define a thought-command mapping according to which operation of the computing device is configured to be controlled through the BCI based on the at least one measured brain signal, the thought-command mapping defining a plurality of thought variants, a first thought variant among the plurality of thought variants corresponding to a first command executable by the computing device, each of the plurality of thought variants configured to be sensed based on a signal analysis of the at least one measured brain signal, detect an operation context of the computing device during operation of the computing device, and remap the thought-command mapping based on the detected operation context during operation of the computing device such that the first thought variant corresponds to a second command executable by the computing device different from the first command. When the thought-command mapping is remapped based on the detected operation context of the computing device, the operation of the computing device can be configured to be controlled through the BCI based on the at least one measured brain signal according to the remapped thought-command mapping.

Furthermore, in accordance with embodiments of the present disclosure, a method can include: activating a muscle-computer interface (muCI) through which a computing device is in operative communication with one or more muscles of a user; defining a muscle activity-command mapping according to which operation of the computing device is configured to be controlled through the muCI based on at least one muscle signal of the user measured via one or more muscle sensors coupled to the one or more muscles of the user, the muscle activity-command mapping defining a plurality of muscle activity variants each of which corresponding a command executable by the computing device, a first muscle activity variant among the plurality of muscle activity variants corresponding to a first command executable by the computing device; detecting an operation context of the computing device during operation of the computing device; and remapping the muscle activity-command mapping based on the detected operation context during operation of the computing device such that the first muscle activity variant corresponds to a second command executable by the computing device different from the first command. In response to the remapping of the muscle activity-command mapping, the operation of the computing device can be configured to be controlled through the muCI based on the at least one measured muscle signal according to the remapped muscle activity-command mapping.

Furthermore, in accordance with embodiments of the present disclosure, a system can include: one or more muscle sensors configured to be coupled to one or more muscles of a user and to measure at least one muscle signal of the user; and a computing device including a memory configured to store at least one program instruction and a processor configured to execute the at least one program instruction, the computing device in operative communication with the one or more muscles of the user through a muscle-computer interface (muCI). The processor can be configured to: define a muscle activity-command mapping according to which operation of the computing device is configured to be controlled through the muCI based on the at least one measured muscle signal, the muscle activity-command mapping defining a plurality of muscle activity variants, a first muscle activity variant among the plurality of muscle activity variants corresponding to a first command executable by the computing device, each of the plurality of muscle activity variants configured to be sensed based on a signal analysis of the at least one measured muscle signal, detect an operation context of the computing device during operation of the computing device, and remap the muscle activity-command mapping based on the detected operation context during operation of the computing device such that the first muscle activity variant corresponds to a second command executable by the computing device different from the first command. In response to the remapping of the muscle activity-command mapping, the operation of the computing device can be configured to be controlled through the muCI based on the at least one measured muscle signal according to the remapped muscle activity-command mapping.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3D illustrate exemplary demonstrations of remapping the thought-command mapping of FIG. 2 according to an application-based operation context;

FIGS. 4, 5A and 5B illustrate exemplary demonstrations of remapping the thought-command mapping of FIG. 2 according to an external event-based operation context; and FIG. 6 illustrates an exemplary demonstration of remapping the thought-command mapping of FIG. 2 according to a user history-based operation context.

Figure 1A:
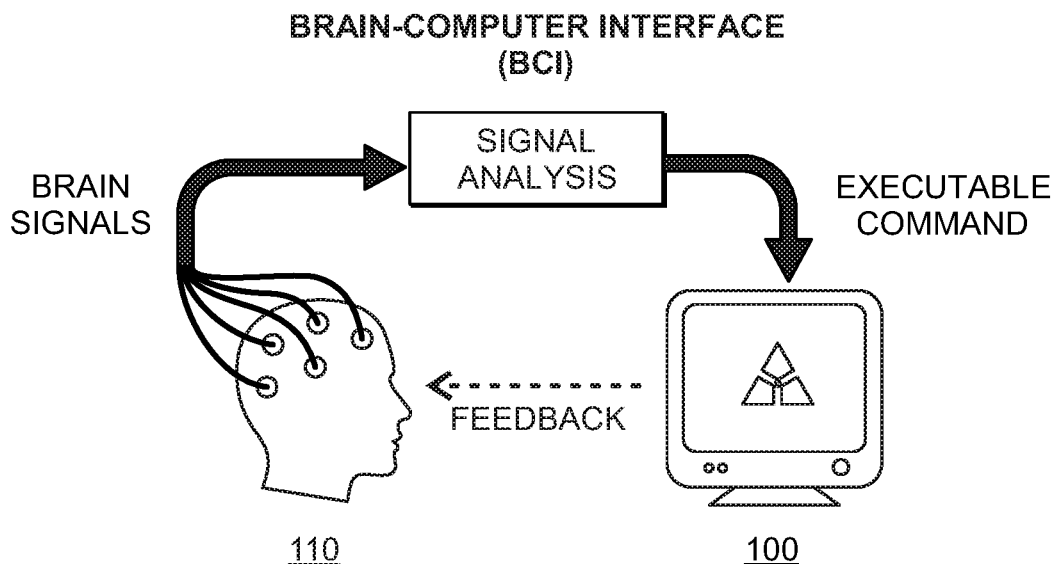
FIGS. 1A and 1B are simplified schematic views of a brain-computer interface (BCI) operatively coupling a computing device with the brain of a user and a muscle-computer interface (muCI) operatively coupling a computing device with one or more muscles of a user, respectively.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "computing device" may refer to a hardware device that includes a memory and a processor, such as, for example, a computer. The memory is configured to store program instructions, and the processor is specifically programmed to execute the program instructions to perform one or more processes which are described further below. In some embodiments, the computing device could be portable, such as, for example, a smart phone, a tablet, a laptop, or other type of mobile device or computer. In some embodiments, the computing device can include a display unit of any suitable type (e.g., liquid crystal display (LCD), light-emitting diode (LED) display, cathode ray tube (CRT) display, etc.) operatively controlled by the processor for displaying various information.

The processor of the computing device may execute one or more of the below methods, or aspects thereof, and may control one or more operative aspects of the computing device, as described herein. Alternatively, a processor outside of the computing device (e.g., a remotely located server) may execute one or more of the below methods, or aspects thereof, and may control remotely one or more operative aspects of the computing device, as described herein. In other embodiments, a combination of the processor of the computing device and the remotely located processor may execute one or more of the below methods, or aspects thereof, and may control one or more operative aspects of the computing device, as described herein.

Furthermore, one or more of the below aspects of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to embodiments of the present disclosure, systems and methods are described herein for dynamic remapping of a thought-command mapping for an HCI-enabled device utilizing a BCI through which a computing device is in operative communication with the brain of a user, an muCI through which a computing device is in operative communication with one or more muscles of the user, or similar HCI implementation. A context of the computing device (referred to herein as an "operation context") can be monitored during operation of the computing device. Upon detecting a change in the operation context of the computing device, the command mapping can be adjusted, or remapped, such that particular types of thought or sequences thereof, or particularly types of muscle activity or sequences thereof, can correspond to commands executable by the computing device relevant to the changed operation context. This can allow for context-specific command mappings and, consequently, improved control of HCI-enabled devices.

Figure 1B:
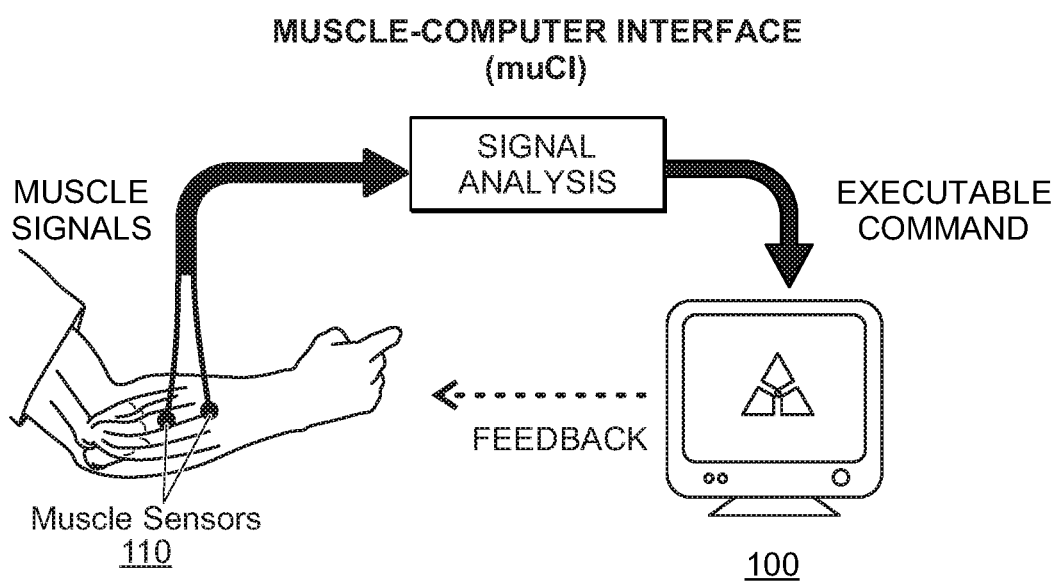

As mentioned above, there can be several different implementations of an HCI including, for example, a BCI and an muCI, as illustrated in FIGS. 1A and 1B. While the BCI and muCI are explicitly described herein, the principles described herein are not limited solely thereto, but are applicable to other types of HCIs as well.

Firstly, FIG. 1A is a simplified schematic view of an exemplary BCI operatively coupling a computing device 100 with the brain of a user 110. As shown in FIG. 1A, the BCI can enable a computing device 100 to be in operative communication with the brain of a user 110. The user 110 can be paired, in various fashions, to a brain sensing device or brain sensors suitable for measuring brain signals of the user 110. In some embodiments, electroencephalography (EEG) sensors can be disposed on the scalp of the user 110, as depicted in FIG. 1A. The present disclosure is not limited to any one type of brain sensor, however. For example, brain signals of the user 110 can alternatively, or additionally, be measured by a magnetoencephalography (MEG) device, a functional magnetic resonance imaging (fMRI) device, an electrocorticography (ECoG) device, and so forth. The brain sensors can be worn, as in the case of EEG, for example, implanted in or on the brain of the user 110, or any combination thereof.

The BCI can include data processing software for performing a variety of signal analysis techniques upon the measured brain signals. The signal analysis can include a series of operations including, for example, initial processing (e.g., amplification, digitalization, etc.) of the measured brain signals, extraction of features from the signals, and classification of patterns among the features. The classified patterns can correspond to any type or category of unique thoughts, or "thought variants," that a person can voluntarily reproduce, as described in greater detail below. In some embodiments, the signal analysis can be repeated a number of times necessary for training a pattern classification scheme.

Secondly, FIG. 1B is a simplified schematic view of an exemplary muCI operatively coupling the computing device 100 with one or more muscles of the user 110. As shown in FIG. 1B, the muCI can enable the computing device 100 to be in operative communication with one or more muscles of the user 110. The user 110 can be paired, in various fashions, to a muscle activity sensing device or muscle sensors suitable for measuring muscle signals of the user 110. In some embodiments, electromyography (EMG) sensors can be disposed on a body part, such as the forearm, of the user 110, as depicted in FIG. 1B. The present disclosure is not limited to any one type of muscle sensor, however. The muscles sensors can be worn, as in the case of EMG, for example, implanted in or on the muscle of the user 110, or any combination thereof.

Similar to the manner in which the BCI operates, the muCI can include data processing software for performing a variety of signal analysis techniques upon the measured muscle signals. The signal analysis can include a series of operations including, for example, initial processing (e.g., amplification, digitalization, etc.) of the measured muscle signals, extraction of features from the signals, and classification of patterns among the features. The classified patterns can correspond to any type or category of unique muscle activities, or "muscle activity variants," that a person can voluntarily reproduce. The muscle activity variants may include, for example, gestures or movements such as pressing, pinching, tapping, or lifting of one or more fingers (in the case of sensors disposed on the forearm, for instance), residual muscular activity such as flexing or tensing particular muscles (in the case of predominant muscular activity lost after a debilitating accident, for instance), and so on, though the types of muscle activity envisioned herein are not limited solely thereto.

Referring to FIGS. 1A and 1B together, the classified patterns of brain or muscle activity can be correlated with a command executable by the computing device 100. This can be performed using a predefined command mapping 200 as described in detail below. The executable command can then be transferred to the computing device 100 for execution. Accordingly, the brain or muscle activity of the user 110, which is measurable in signal form, can be translated to a command executable by the computing device 100 via the BCI, enabling the user 110 to control operation of the computing device 100.

Upon execution of the command, the computing device 100 can provide feedback to the user 110 to confirm to the user 110 that a desired operation has been performed successfully. The feedback can be provided in various forms including, for example, a visual response, an audible response, a tactile response, or the like.

In some embodiments, the processing of the measured brain or muscle signals can be performed by the computing device 100. In other embodiments, the processing of the measured brain or muscle signals can be performed by a remote server or computing device (not shown) which receives the signals and outputs some result of the processing (e.g., extracted features, classified patterns, identified executable commands, etc.) to the computing device 100. In yet other embodiments, the processing of the measured brain or muscle signals can be performed by a combination of the computing device 100 and a remote server or computing device.

As mentioned above, an HCI-enabled device can utilize a predefined command mapping to translate an identified user action, such as a thought variant or muscle activity variant, using the signal analysis techniques described above, for instance, into a command 220 executable by the computing device 100. In some cases, a plurality of command mappings can be predefined, each of which corresponding to a particular application, such as a word processor, a web browser, a game, an email client, and so forth, configured for execution on the computing device 100.

Figure 2:
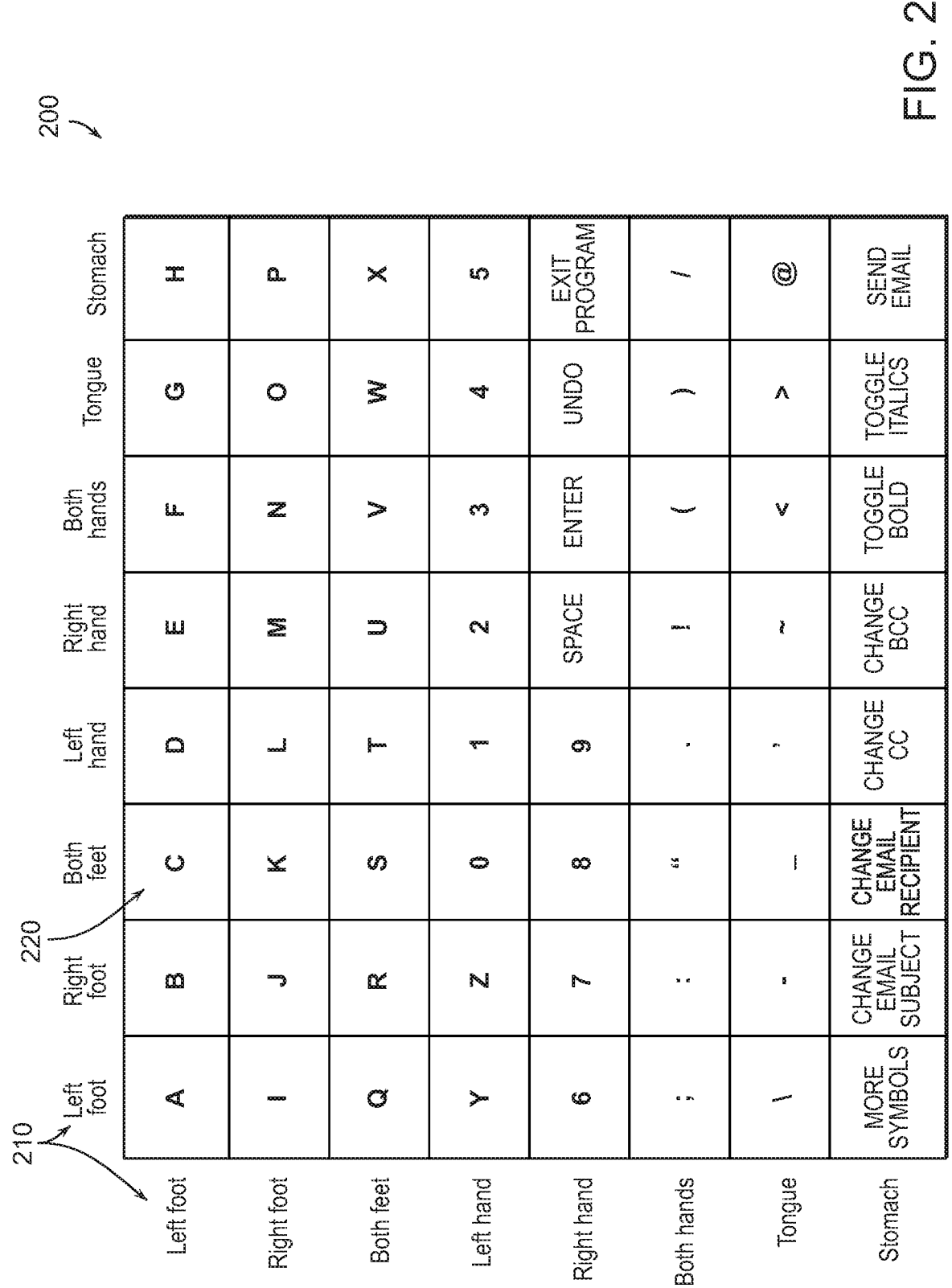
FIG. 2 is a diagrammatic view of an exemplary thought-command mapping corresponding to an email application.

To illustrate, FIG. 2 is a diagrammatic view of an exemplary command mapping 200 corresponding to an email application. For the purpose of demonstration, the command mapping 200 as shown in FIG. 2, as well as the remaining figures, can correspond specifically to a thought-command mapping applicable in a computing device utilizing a BCI. However, the principles discussed are equally applicable to a muscle activity-command mapping applicable in a computing device utilizing an muCI. Thus, it is understood that the thought-command mapping 200 as exemplarily shown throughout the figures can be modified to replace thought variants with muscle activity-variants or other types of user action variants measurable through sensors coupled to the user 110 within the purview of an HCI.

Referring to FIG. 2, the thought-command mapping 200 can provide the user 110 with the ability to control operation of the computing device 100 based upon thought (e.g., brain activity). That is, operation of the computing device 100 can be controlled using the measured brain signals of the user 110 according to the thought-command mapping 200, as described in detail below.

The thought-command mapping 200 can provide a map which defines multiple types of thought (referred to herein as "thought variants" 210) and correlates each thought variant 210 with a specific command 220 executable by the computing device 100. The thought variant, as referenced throughout herein, can be any type or category of thought or attention that a person (i.e., user 110) can voluntarily reproduce. The thought variants 210 can include, for example, thoughts of a particular body part, thoughts of a particular sound or word, thoughts of a particular image, thoughts of a particular object visible to the user, motor imagery, and so forth, as well as any combination thereof. Thought variants 210 can be sensed by applying signal analysis techniques to the measured brain signals of the user 110 as described above with reference to FIG. 1A.

The following examples refer primarily to thought variants of body parts or imagined movement of body parts, known as motor imagery. However, the scope of the present disclosure is not limited to thought variants of any particular type or category. Other thought variants examples comprise subvocalizing sounds or words (i.e., saying sounds or words internally), imaging visual images, paying attention to objects in the surrounding environment, and so on.

The thought-command mapping 200 can be formed of varying lengths. In a first example, the thought-command mapping 200 could include a single-length mapping scheme in which a first thought variant 210 among a plurality of predefined thought variants 210 corresponds to a first command 220 executable by the computing device 100. For instance, a thought variant 210 matching the user's left foot, i.e., the user 110 concentrates on or imagines moving his or her left foot, can be mapped to typing the letter 'A'. If the user 110 is composing an email, for example, thinking of his or her left foot can cause the computing device to type the letter 'A'.

In a second example, the thought-command mapping 200 could include a multi-length mapping scheme in which a thought variant 210 followed by one or more subsequent thought variants 210 corresponds to a first command 220 executable by the computing device 100. One such multi-length mapping scheme is demonstrated in FIG. 2 which represents an exemplary, non-limiting double-length mapping scheme. As shown in FIG. 2, a first-level thought variant 210 (listed along the vertical axis) followed by a second-level thought variant 210 (listed along the horizontal axis) can correspond to a first command 220 executable by the computing device 100. For instance, a first-level thought variant 210 matching the user's left foot followed by a second-level thought variant 210 matching the user's right hand, i.e., the user 110 concentrates on or imagines moving his or her left foot and then concentrates on or imagines moving his or her right hand, can be mapped to typing the letter 'E'. If the user 110 is composing an email, for example, thinking of his or her left foot followed by thinking of his or her right hand can cause the computing device to type the letter 'E'.

Although the following examples refer primarily to a double-length thought-command mapping scheme, the thought-command mapping 200 is not limited solely as such.

At any given time, the computing device 100 can have one or more applications actively running, such as a word processor, a web browser, a game, an email client, and so forth. For this reason, multiple thought-command mappings can be defined, each of which unique to a particular application.

Referring again to FIG. 2, for example, the thought-command mapping 200 can correspond to an email client application. In such case, the thought-command mapping 200 can be unique to common functions and/or operations performed by the computing device 100 while running an email client application. For example, the computing device-executable commands 220 shown in the thought-command mapping grid of FIG. 2 include ASCII characters to enable the user 110 to input text, as well as a variety of relevant operations including "SEND EMAIL," "CHANGE EMAIL SUBJECT," "CHANGE EMAIL RECIPIENT," "CHANGE CC," "CHANGE BCC," "TOGGLE BOLD," "TOGGLE ITALICS," etc.

Meanwhile, if the user 110 is operating the computing device 100 as the context (referred to herein as "operation context") of the computing device 100 changes, the thought-command mapping 200 may require updating to reflect the new context. For instance, if the user 110 sends an email through the aforementioned email client and then switches the actively running application to a particular game, commands such as "SEND EMAIL" and "CHANGE EMAIL SUBJECT" may no longer be relevant to the current use of the computing device 100.

Accordingly, as the operating context of the computing device 100 changes, the thought-command mapping 200 can be dynamically updated to reflect the changed context. Referring again to the above example, upon switching the actively operating application from an email client to a game, the thought-command mapping 200 can be changed from an email client-specific mapping, as shown in FIG. 2, to a mapping specific to the currently operating game.

The operation context of the computing device 100 can be associated with at least three different types of context relevant to the user's operation of the computing device 100: (1) an application-based context (e.g., an application currently executing on the computing device 100); (2) an event-based context (e.g., an external event occurring during operation of the computing device 100); and (3) a user history-based context (e.g., a user history associated with the computing device 100). Upon detecting a change in any of the above-listed operation contexts during operation of the computing device 100, the thought-command mapping 200 can be remapped accordingly. Each of these operation context types will be described in detail below with reference to illustrative, non-limiting examples.

Firstly, FIGS. 3A-3D illustrate exemplary demonstrations of remapping the thought-command mapping 200 according to an application-based operation context which can include a context of the computing device 100 relating to the application currently executing on the computing device 100. For example, the application-based operation context of the computing device 100 can be associated with a given application currently executing on the computing device 100, the state of the application currently executing on the computing device 100, and actions performed by the user 110 within the application currently executing on the computing device 100.

Figure 3A:
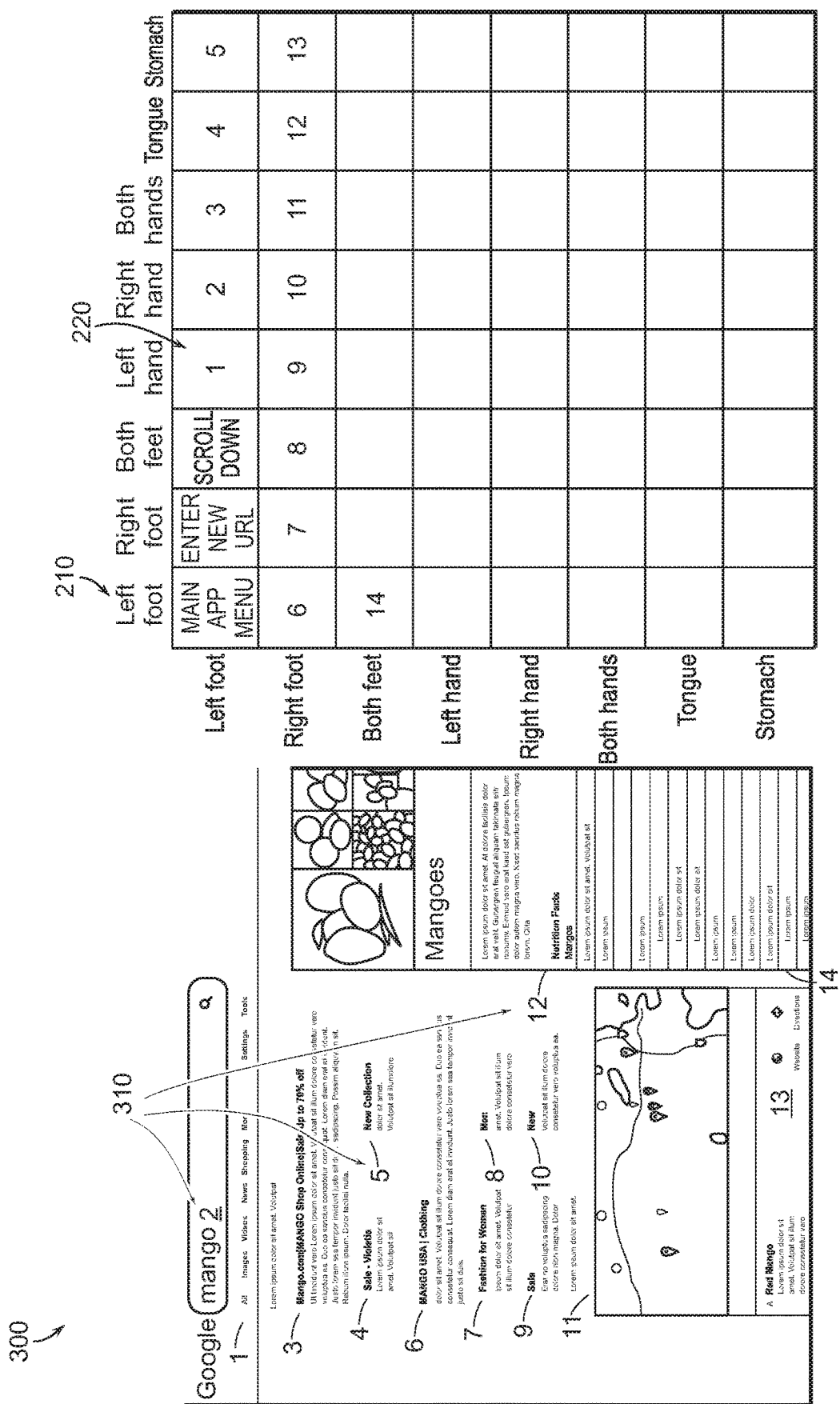

Referring first to FIG. 3A, an example involving a thought-command mapping 200 and a web browser application 300 (i.e., "first application") currently executing on the computing device 100 is shown. The web browser application 300 can, for example, enable the user 110 to navigate to various web pages and perform various operations therein, as would be well-understood in the art. The web browser application 300 can be displayed on a display unit of the computing device 100.

In some embodiments, the web browser application 300, or any other application executing on the computing device 100, whether described herein or otherwise, can be displayed on the display unit of the computing device 100 simultaneously with an image characterizing the thought-command mapping 200. For example, as shown in FIGS. 3A-3D, the application currently executing on the computing device 100 (e.g., web browser application 300, etc.) can be displayed on a first screen area of the display unit, and simultaneously, an image characterizing the thought-command mapping 200 can be displayed in a second screen area of the display unit. In some cases, the first screen area and the second screen area can correspond to separate, non-overlapping areas of the screen, respectively, such that each of the currently executing application and the image characterizing the thought-command mapping 200 can be displayed entirely. In some embodiments, the size and/or position of the first screen area and the second screen area, respectively, can be adjusted according to the preferences of the user 110. Moreover, when the thought-command mapping 200 is remapped, as discussed in detail herein, the image characterizing the thought-command mapping 200 can be refreshed in real-time to reflect the remapped thought-command mapping.

As further shown in FIGS. 3A-3D, the image characterizing the thought-command mapping 200 can include an indication of each of the thought variants 210 and each command 220 executable by the computing device 100 to which each thought variant 210 corresponds. Thus, the user 110 can be made aware of the current thought-command mapping 200, preventing possible confusion as to the thought variant-command correspondence at a given time. In some embodiments, the image characterizing the thought-command mapping 200 can include a grid showing the thought variant-command correspondence, such as the thought-command mapping grid shown in FIGS. 3A-3D. Furthermore, as the thought-command mapping 200 is updated according to the detected operation context of the computing device 100, as described in detail herein, the image characterizing the thought-command mapping 200 can also update in real-time so as to reflect any changes made to the thought-command mapping 200.

As explained above, the thought-command mapping 200 can include commands 220 executable by the computing device 100 corresponding to the application currently being executed. Thus, the thought-command mapping 200 can be defined according to the detected operation context of the computing device 100 (i.e., the application currently executing on the computing device 100, the state of the currently executing application, actions performed by the user 110 within the currently executing application, etc.). Referring again to the example of FIG. 3A, the thought variants 210 can be mapped to executable commands 220 relevant to typical usage of the web browser application 300 including, for example, "MAIN APP MENU," which allows the user 110 to launch a new application, "ENTER NEW URL," "SCROLL DOWN," "SCROLL UP," and so forth. For the purpose of the present disclosure, the thought-command mapping 200 of FIG. 3A can be referred to as a "first thought-command mapping."

In addition, the web browser application 300 can include a plurality of object markers 310, such as numbers, letters, or other symbols, corresponding to interactive or "clickable" objects in the application 300, such as a web page link, a search bar, a button, or any other object in the application 300. Any application executing on the computing device 100, whether described herein or otherwise, can include such object markers. Accordingly, in addition to the application-relevant operations listed above, the executable commands 220 of the thought-command mapping 200 can include the object markers 310. For example, as shown in FIG. 3A, a first-level thought variant 210 matching the user's left foot followed by a second-level thought variant 210 matching the user's right hand, i.e., the user 110 concentrates on or imagines moving his or her left foot and then concentrates on or imagines moving his or her right hand, can be mapped to the object marker '2', which would activate the search bar 320 of the web browser application 300, allowing the user 110 to enter a search query.

Referring next to FIG. 3B, it is assumed, for demonstration purposes, that the user 110 performs the above thought variant sequence (i.e., concentrating on or imagining moving left foot, followed by concentrating on or imagining moving right hand) in order to select the search bar 320 of the web browser application 300. In response to executing such command, a change of operation context of the computing device 100 can be detected. Specifically, in this example, the state of the application 300 has changed (the application 300 is accepting text in the form of a search query) based on an action performed by the user 110 within the application 300 (activating the search bar 320).

Thus, the thought-command mapping 200 can be remapped in response to the detection of the changed operation context. Such remapping can be performed immediately upon detecting the changed operation context, during operation of the computing device 100, such that the executable commands 220 available to the user 110 are always specific to the current operation context. For the purpose of the present disclosure, the remapped thought-command mapping 200 of FIG. 3B can be referred to as a "second thought-command mapping."

The remapping of the thought-command mapping 200 can involve modifying the correspondence of one or more thought variant-executable command pairs. For example, in FIG. 3A, a first-level thought variant 210 matching the user's left foot followed by a second-level thought variant 210 matching the user's right hand, i.e., the user 110 concentrates on or imagines moving his or her left foot and then concentrates on or imagines moving his or her right hand, can be mapped to the object marker '2', which would activate the search bar 320 of the web browser application 300. In FIG. 3B, after remapping the thought-command mapping 200, the same thought variant sequence (first-level thought variant 210 matching the user's left foot followed by second-level thought variant 210 matching the user's right hand) can correspond to a different command 220: typing the letter 'A'. The thought-command mapping 200 can include other executable commands 220 relevant to the current operation context as well, including, for instance, suggested search queries. Moreover, the thought-command mapping 200 can be remapped while the user 110 is typing in the search box 320 such that the suggested search queries included in the thought-command mapping 200 are selected based upon the current state of the user's search query. For example, the suggested search queries included in the thought-command mapping 200 can be selected to complete the user's unfinished search query.

Accordingly, a first thought variant 210 that corresponds to a first command 220 executable by the computing device 100 can correspond to a second command 220, different from the first command 220, after remapping the thought-command mapping 200. Upon the remapping of the thought-command mapping 200, the operation of the computing device 100 can be controlled based on the measured brain signals of the user 110, through the BCI, according to the remapped thought-command mapping 200.

Figure 3C:
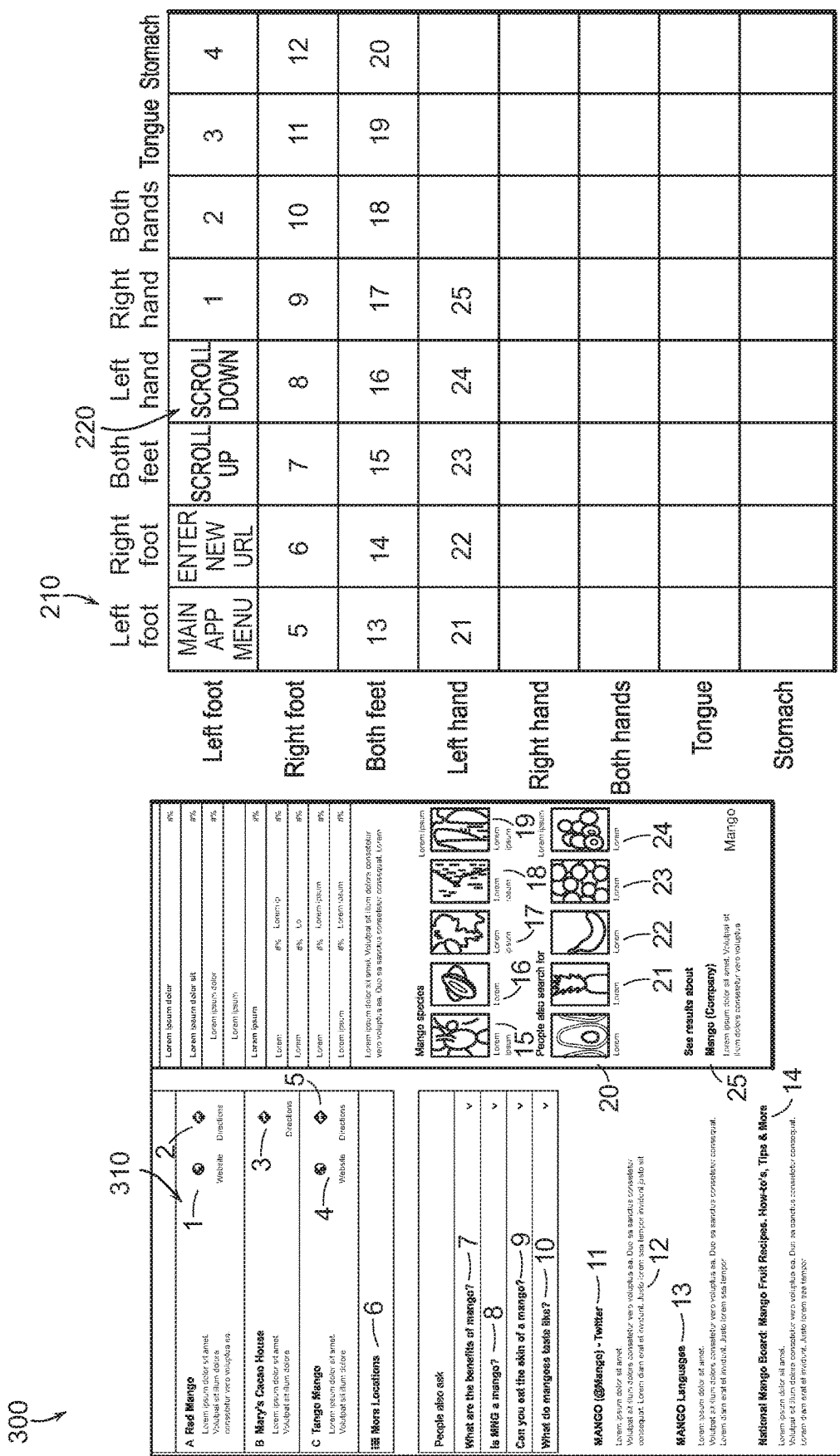

Referring next to FIG. 3C, it is assumed, for demonstration purposes, that the user 110 performs a thought variant sequence corresponding to the "SCROLL DOWN" command 220 (i.e., first-level thought variant 210 matching the user's left foot followed by second-level thought variant 210 matching both of the user's feet (see FIG. 3A)). Upon executing such command, another change of operation context of the computing device 100 can be detected. Specifically, in this example, the state of the application 300 has changed (the web browser application 300 is displaying a different portion of the web page) based on an action performed by the user 110 within the application 300 (scrolling down).

In response to the changed operation context, the thought-command mapping 200 can be remapped according to the new, current state of the application 300. For the purpose of the present disclosure, the remapped thought-command mapping 200 of FIG. 3C can be referred to as a "second thought-command mapping."

For example, the object markers 310 can be arranged based on the contents of the portion of the web page being displayed. Thus, some of the thought variants 210 can be mapped to commands 220 that correspond to object markers 310 pointing to objects (e.g., a web page link, a search bar, a button, etc.) within the current page view. Other the thought variants 210 can be mapped to the same commands 220, such as "MAIN APP MENU," "ENTER NEW URL," "SCROLL UP," "SCROLL DOWN," and so forth, after the remapping of the thought-command mapping 200 since these commands 220 remain relevant or useful to operation of the web browser application 300 after the operation context change of FIG. 3C. Although the thought-command mapping 200 can be remapped such that certain commands 220 are removed from the thought-command mapping 200 when they are no longer relevant or applicable to the current usage of the application 300. For example, if the user 110 has scrolled down to the bottom of the web page in the web browser application 300, the command 220, "SCROLL DOWN," can be removed from and/or replaced in the thought-command mapping 200.

Figure 3D:
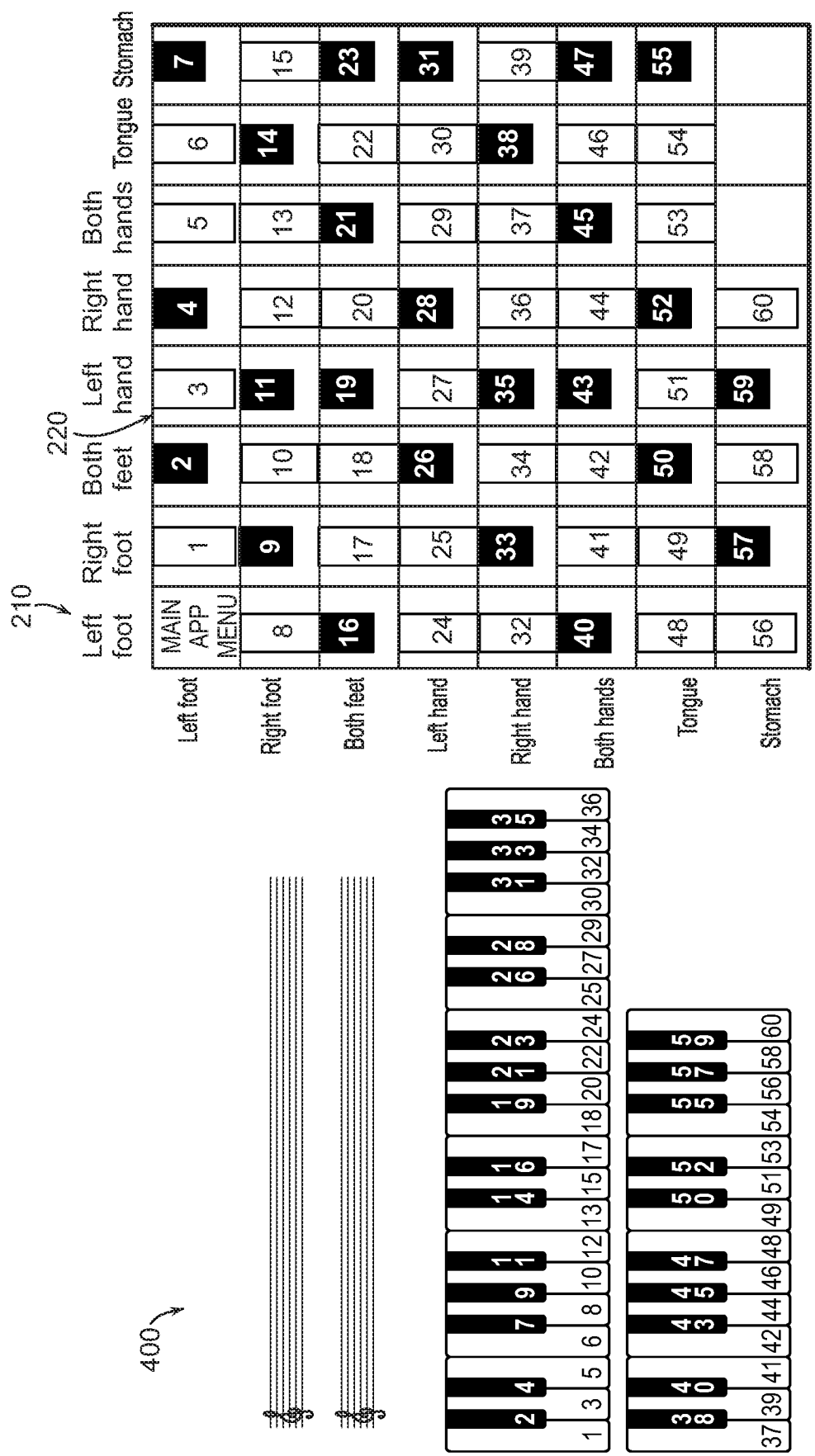

Referring next to FIG. 3D, it is assumed, for demonstration purposes, that the user 110 launches a different application: virtual piano application 400 (i.e., "second application"). Upon launching a new application, another change of operation context of the computing device 100 can be detected. In this example, the application currently being executed on the computing device 100 has changed. Similar to the web browser application 300, the virtual piano application 400 can be displayed on a first screen area of the display unit, and simultaneously, the image characterizing the thought-command mapping 200 can be displayed in a second screen area of the display unit. It is to be understood that neither the currently nor previously executing application is limited to any one application.

In response to the changed operation context, the thought-command mapping 200 can be remapped according to the newly launched application 400. For the purpose of the present disclosure, the remapped thought-command mapping 200 of FIG. 3D can be referred to as a "second thought-command mapping."

Like the remapping examples of the thought-command mapping 200 described above, the executable commands 220 can change according to the current operation context, whereas the set of defined thought variants 210 can remain fixed. Here, the thought variants 210 can be remapped to commands 220 corresponding to piano keys of the virtual piano application 400. For example, a first-level thought variant 210 matching the user's left foot followed by a second-level thought variant 210 matching the user's right hand, i.e., the user 110 concentrates on or imagines moving his or her left foot and then concentrates on or imagines moving his or her right hand, can be mapped to the piano key '4', which may cause the computing device 100 to activate the piano key '4' in the virtual piano application 400, generating an audible and/or visual output (e.g., outputting a sound matching the activated piano key). The thought variants 210 can additionally, or alternatively, be remapped to other commands 220 relevant to the virtual piano application 400 such as useful commands like "INCREASE VOLUME," "DECREASE VOLUME," "CHANGE TONE," "ADD SOUND EFFECT," or the like.

Figure 4:
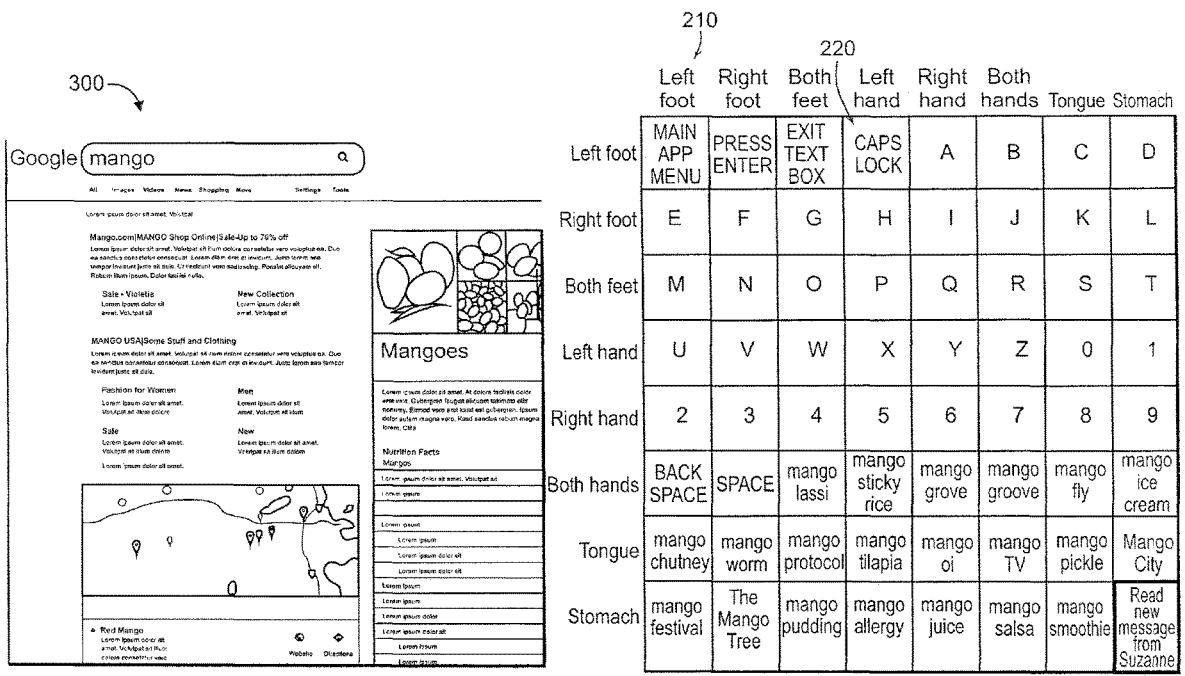
Figure 5B:
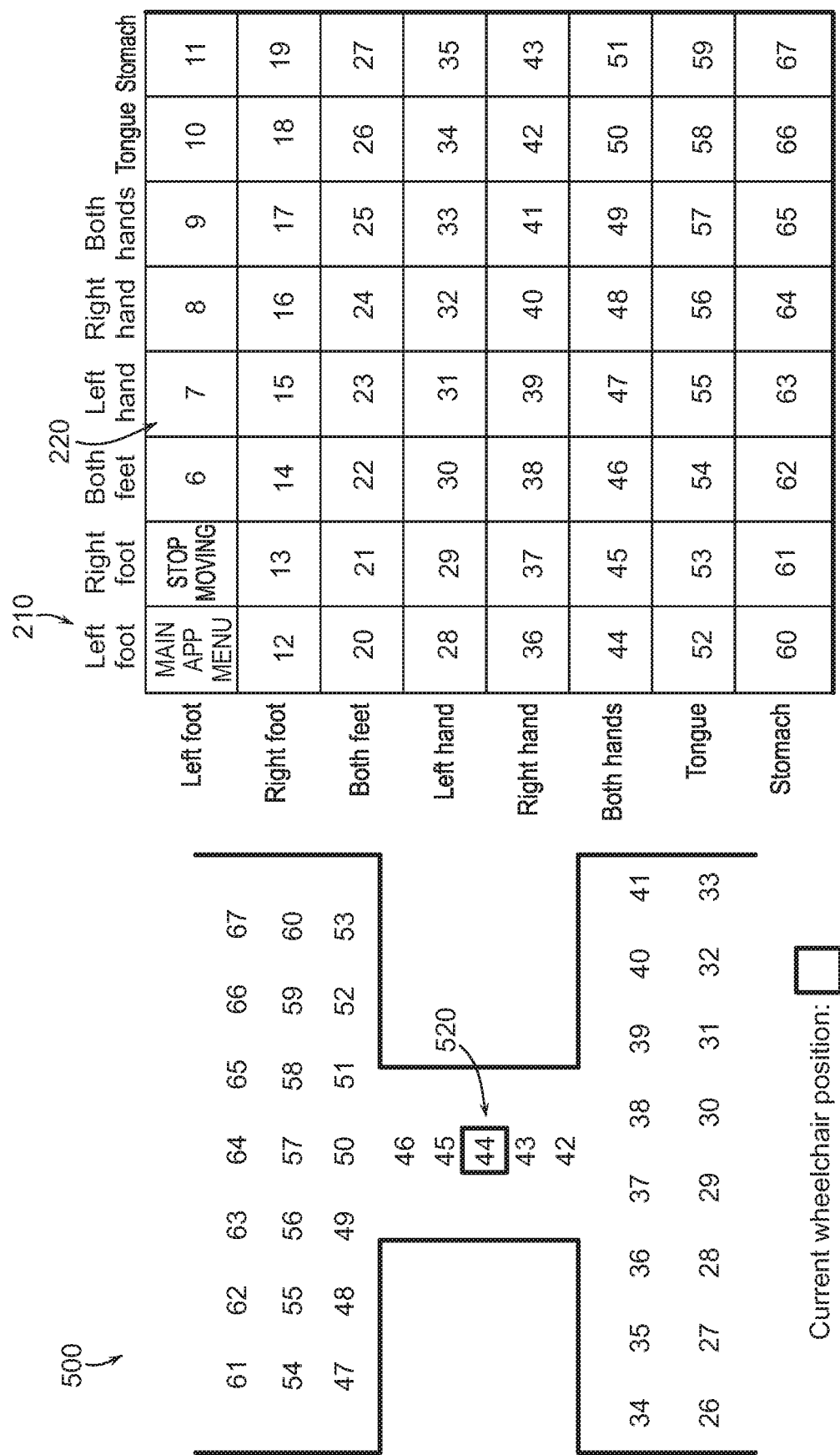

Next, FIGS. 4, 5A and 5B illustrate exemplary demonstrations of remapping the thought-command mapping 200 according to an external event-based operation context which can include a context of the computing device 100 relating to an external event occurring during operation of the computing device 100. For example, the external event-based operation context of the computing device 100 can be associated with one or more external events unrelated to the application currently executing on the computing device 100 occurring during operation of the computing device 100. In some cases, the external event can be an event to which the user 110 might want to respond and/or of which the user 110 should be aware.

Referring first to FIG. 4, which illustrates the web browser application 300 and a corresponding thought-command mapping 200, such as the example mappings described above, it can be assumed for demonstration purposes that the user 110 receives a message (e.g., email, instant message, etc.) from another user, Suzanne, during use of the web browser application 300. Here, receipt of the message from another user during execution of an application can be considered an external event which changes the operation context of the computing device 100.

In response to the changed operation context, the thought-command mapping 200 can be remapped according to the external event such that the user 110 can efficiently address or respond to the event. Particularly, the thought-command mapping 200 can be remapped to include as an executable command 220 an external event-based command 410. For the purpose of the present disclosure, the remapped thought-command mapping 200 of FIG. 4 can be referred to as a "second thought-command mapping."

In some embodiments, a single command 210 in the thought-command mapping 200 can be replaced with a new command 210 relevant to the external event, leaving the other commands 210 the same. For example, a first-level thought variant 210 matching the user's stomach followed by a second-level thought variant 210 matching the user's stomach, i.e., the user 110 concentrates on or imagines moving his or her stomach a first time and then concentrates on or imagines moving his or her stomach a second time, can be mapped to a command ("Read new message from Suzanne") that causes the computing device 100 to retrieve and display the newly received message.

Once the user 110 executes the command 210 to read the new message, the thought-command mapping 200 can be remapped again to include relevant commands 210 such as, for example, "RESPOND TO MESSAGE," "COMPOSE NEW MESSAGE," "CLOSE WINDOW," etc. Conversely, if the user 110 does not execute the command 210 to read the new message after a predetermined period of time, the thought-command mapping 200 can be remapped so that the thought-command mapping 200 returns to its previous state (before the message was received).

In another example, FIGS. 5A and 5B illustrate a wheelchair control application 500 through which the user 110 can control the location of his or her wheelchair. To this end, the wheelchair control application 500 can include an interface showing a plurality of locations 510 at which the wheelchair can be positioned within a given floorplan. The current wheelchair position 520 can be signified by a box surrounding the wheelchair's current location, for example. In some embodiments, the computing device 100 can be coupled to the wheelchair such that the computing device 100 moves in conjunction with the wheelchair.

Meanwhile, the thought-command mapping 200 can include a subset of the locations 510 based on a current view of the wheelchair control application 500 interface. For the purpose of the present disclosure, the thought-command mapping 200 of FIG. 5A can be referred to as a "first thought-command mapping."

For example, each location 510 visible in the wheelchair control application 500 interface of FIG. 5A can be included as an executable command 220 in the thought-command mapping 200 and mapped to a particular thought variant 210 (or sequence of thought variants 210). Thus, if the brain activity of the user 110 matches a thought variant 210 that corresponds to a particular wheelchair location 510, the computing device 100 can initiate control of the wheelchair such that the wheelchair moves to the particular location. The thought-command mapping 200 can include other relevant commands, as well, such as "STOP MOVING," and so forth. It is understood that the operation of external devices other than wheelchairs can also be controlled by the computing device 100 through the BCI (or muCI, if applicable) using the brain activity of the user 110.

Here, it is assumed, for demonstration purposes, that the user 110 selects the wheelchair location '44' by concentrating on or imagining moving both hands a first time and then concentrating on or imagining moving both hands a second time. Accordingly, the computing device 100 can execute the corresponding command 210 by causing the wheelchair to move to location '44', as shown in FIG. 5B. In another embodiment, the wheelchair of the user 110 could be moved manually to location '44', either by the user 110 him or herself, or by another person.

In this example, the wheelchair (and computing device 100) moving from location '4' to location '44' can constitute an external event that effects a change in operation context of the computing device 100. Upon detecting this external event (i.e., a location change), the thought-command mapping 200 can be remapped according to the new, current location 520 of the wheelchair, which changes as the wheelchair moves toward its destination. As the external event occurs, that is, during movement of the wheelchair, the thought variants 210 can be remapped to commands 220 corresponding to nearby or otherwise accessible locations 510. For example, once the wheelchair arrives at its destination of location '44' (see FIG. 5B), a first-level thought variant 210 matching both hands of the user 110 followed by a second-level thought variant 210 again matching both hands of the user 110 can be mapped to the location '49', which may cause the computing device 100 to move the wheelchair to said location. Prior to the operation context change, the same thought variant sequence corresponded to location '4' (see FIG. 5A). For the purpose of the present disclosure, the remapped thought-command mapping 200 of FIG. 5B can be referred to as a "second thought-command mapping."

The external events described above are merely provided as examples and do not limit the scope of the present disclosure. Thus, the remapping of the thought-command mapping 200 can be initiated upon detecting a variety of external events affecting the computing device 100 and/or user 110 including, but not limited to, incoming electronic communications received at the computing device 100, a change of location of the computing device 100 and/or user 110, an alert or notification pushed to the computing device 100, an activity sensed by the computing device 100, and so on.

Next, FIG. 6 illustrates an exemplary demonstration of remapping the thought-command mapping 200 according to a user history-based operation context which can include a context of the computing device 100 relating to a history of the user 110 associated with the application currently executing on the computing device 100. For example, the user history-based operation context of the computing device 100 can be associated with an action the user 110 has performed previously within the application currently executing on the computing device 100.

In this example, for demonstration purposes, it can be assumed that the computing device 100 is currently executing an email application. The thought-command mapping 200 can be defined in a manner similar to the thought-command mapping 200 of FIG. 2, which also corresponds to an email application. However, the thought-command mapping 200 can be remapped to include one or more user history-based commands 610 provided based on a user history associated with the email application, such as frequent contacts, as shown in FIG. 6. The user history-based commands 610 can be provided as shortcuts to enhance convenience for the user 110, and can replace one or more executable commands 210 that could otherwise be included in the thought-command mapping 200 (e.g., see FIG. 2). Other user history-based commands 610 can include, for example, frequently used words or phrases, frequently performed commands or operations, and so forth. Over time, the user history-based commands included in a given thought-command mapping 200 can change based upon the user's usage of the computing device 100. For the purpose of the present disclosure, the remapped thought-command mapping 200 of FIG. 6 can be referred to as a "second thought-command mapping."

In the event that the application currently executing on the computing device 100 is a non-BCI-enabled application, that is, an application made for an able-bodied user, a "point-and-click" control scheme can be simulated in which the screen area of the application is divided into a plurality of cells or a grid. Each of the cells can encompass a specific region of the screen area. As such, the thought-command mapping 200 can be defined such that each thought variant 210 corresponds to a particular cell of the plurality of cells. For example, in a double-length mapping scheme, such as those illustrated in FIGS. 2-6, a first-level thought variant 210 can correspond to a specific row of the screen area, and a second-level thought variant 210 can corresponds to a specific column of the screen area. Execution by the user 110 of a particular first-level thought variant-second-level thought variant pairing can cause the computing device 100 to select/activate/execute the region of the screen area corresponding to said pairing. In some cases, if the plurality of cells are courser or larger than the application elements (e.g., multiple selectable buttons are positioned inside of a single cell), a cell can be selected and then sub-divided into smaller cells to enable the user 110 to make selections or perform operations with greater granularity.

Accordingly, the systems and methods for dynamically remapping a command mapping, e.g., a thought-command mapping, a muscle activity-command mapping, etc., in a HCI-enabled computing device as described herein can provide for context-specific command mappings and improved control of HCI-enabled devices. By monitoring for changes in the operation context of the computing device and remapping the command mapping accordingly, the user can operate a wider range of applications, as well as a greater number of operations within each application, without increasing the complexity of the thought or muscle activity variants to be performed by the user. This provides an effective, safe, and cost-effective implementation of thought- or muscle-controlled computer use.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
activating a brain-computer interface (BCI) through which a computing device is in operative communication with a brain of a user;
defining a thought-command mapping according to which operation of the computing device is configured to be controlled through the BCI based on at least one brain signal of the user measured via one or more brain sensors coupled to the brain of the user, the thought-command mapping defining a plurality of thought variants each of which corresponding a command executable by the computing device, a first thought variant among the plurality of thought variants corresponding to a first command executable by the computing device;
detecting an operation context of the computing device during operation of the computing device;
remapping the thought-command mapping based on the detected operation context during operation of the computing device such that the first thought variant corresponds to a second command executable by the computing device different from the first command,
wherein, in response to the remapping of the thought-command mapping, the operation of the computing device is configured to be controlled through the BCI based on the at least one measured brain signal according to the remapped thought-command mapping; and
when an application currently executing on the computing device is a non-BCI-enabled application, dividing a screen area of the application into a plurality of cells each of which including a specific region of the screen area,
wherein each of the plurality of thought variants corresponds to a particular cell of the plurality of cells according to the thought-command mapping.

2. The method of claim 1, further comprising:
measuring the at least one brain signal of the user using the one or more brain sensors;
sensing the first thought variant based on a signal analysis of the at least one measured brain signal;
determining that the second command corresponds to the first thought variant according to the remapped thought-command mapping; and
controlling the operation of the computing device so as to execute the second command.

3. The method of claim 1, wherein the thought-command mapping is remapped in response to detecting a change of the operation context during operation of the computing device.

4. The method of claim 1, wherein the operation context is associated with at least one of an application currently executing on the computing device, an external event occurring during operation of the computing device, and a user history associated with the computing device.

5. The method of claim 1, further comprising:
detecting a first application currently executing on the computing device, the thought-command mapping being a first thought-command mapping corresponding to the first application.

6. The method of claim 5, further comprising:

in response to a second application different from the first application being launched on the computing device, remapping the thought-command mapping such that the remapped thought-command mapping is a second thought-command mapping corresponding to the second application, the second thought-command mapping different from the first thought-command mapping.

7. The method of claim 5, further comprising:

in response to a detection of a user action performed in the first application, remapping the thought-command mapping such that the remapped thought-command mapping is a second thought-command mapping based on the detected user action, the second thought-command mapping different from the first thought-command mapping.

8. The method of claim 5, further comprising:

in response to a detection of an external event occurring during the execution of the first application, remapping the thought-command mapping such that the remapped thought-command mapping is a second thought-command mapping based on the detected external event, the second thought-command mapping different from the first thought-command mapping.

9. The method of claim 8, wherein the external event is detected when the computing device receives an incoming electronic message.

10. The method of claim 8, wherein the external event is detected when the computing device detects a change of a location of the user.

11. The method of claim 1, further comprising:

in response to a detection of a user history associated with the first application, remapping the thought-command mapping such that the remapped thought-command mapping is a second thought-command mapping based on the detected user history, the second thought-command mapping different from the first thought-command mapping.

12. The method of claim 11, wherein the user history is associated with at least one of contacts of the user, previously used words or phrases, and previously executed commands.

13. The method of claim 1, further comprising:

controlling a display unit of the computing device so as to simultaneously display an application currently executing on the computing device and an image characterizing the thought-command mapping, wherein the application currently executing on the computing device is displayed in a first screen area of the display unit, and the image characterizing the thought-command mapping is displayed in a second screen area of the display unit.

14. The method of claim 13, wherein the image characterizing the thought-command mapping indicates each of the plurality of thought variants and each command executable by the computing device to which each of the plurality of thought variants corresponds.

15. The method of claim 13, wherein the image characterizing the thought-command mapping includes a grid showing a correspondence between the plurality of thought variants and each command executable by the computing device.

16. The method of claim 1, further comprising:

detecting a first application currently executing on the computing device, the thought-command mapping being a first thought-command mapping corresponding to the first application;

controlling a display unit of the computing device so as to display an image characterizing the first thought-command mapping;

in response to a second application different from the first application being launched on the computing device, remapping the thought-command mapping such that the remapped thought-command mapping is a second thought-command mapping corresponding to the second application, the second thought-command mapping different from the first thought-command mapping; and controlling the display unit so as to update the displayed image such that the displayed image characterizes the second thought-command mapping.

17. The method of claim 1, wherein the thought-command mapping includes a multi-length mapping scheme in which a first thought variant among the plurality of thought variants followed by one or more subsequent thought variants among the plurality of thought variants corresponds to a command executable by the computing device.

18. The method of claim 1, wherein the plurality of thought variants include thoughts of a particular body part, thoughts of a particular sound or word, thoughts of a particular image, thoughts of a particular object visible to the user, motor imagery, or any combination thereof.

19. The method of claim 1, further comprising:

controlling operation of an external device in communication with the computing device through the BCI based on the at least one measured brain signal according to the thought-command mapping.

20. A method comprising:

(a) activating a muscle-computer interface (muCI) through which a computing device is in operative communication with one or more muscles of a user;

(b) defining a muscle activity-command mapping according to which operation of the computing device is configured to be controlled through the muCI based on at least one muscle signal of the user measured via one or more muscle sensors coupled to the one or more muscles of the user, the muscle activity-command mapping defining a plurality of muscle activity variants each of which corresponding a command executable by the computing device, a first muscle activity variant among the plurality of muscle activity variants corresponding to a first command executable by the computing device;

(c) detecting an operation context of the computing device during operation of the computing device;

(d) remapping the muscle activity-command mapping based on the detected operation context during operation of the computing device such that the first muscle activity variant corresponds to a second command executable by the computing device different from the first command;

wherein, in response to the remapping of the muscle activity-command mapping, the operation of the computing device is configured to be controlled through the muCI based on the at least one measured muscle signal according to the remapped muscle activity-command mapping; and (e) when an application currently executing on the computing device is a non-muCI-enabled application, dividing a screen area of the application into a plurality of cells each of which including a specific region of the screen area, wherein each of the plurality of muscle activity variants corresponds to a particular cell of the plurality of cells according to the muscle activity-command mapping.

21. The method of claim 20, further comprising:
measuring the at least one muscle signal of the user using the one or more muscle sensors;
sensing the first muscle activity variant based on a signal analysis of the at least one measured muscle signal;
determining that the second command corresponds to the first muscle activity variant according to the remapped muscle activity-command mapping; and
controlling the operation of the computing device so as to execute the second command.

22. The method of claim 20, wherein the muscle activity-command mapping is remapped in response to detecting a change of the operation context during operation of the computing device.

23. The method of claim 20, wherein the operation context is associated with at least one of an application currently executing on the computing device, an external event occurring during operation of the computing device, and a user history associated with the computing device.

24. The method of claim 20, further comprising:
detecting a first application currently executing on the computing device, the muscle activity-command mapping being a first muscle activity-command mapping corresponding to the first application; and
in response to a second application different from the first application being launched on the computing device, remapping the muscle activity-command mapping such that the remapped muscle activity-command mapping is a second muscle activity-command mapping corresponding to the second application, the second muscle activity-command mapping different from the first muscle activity-command mapping.

25. The method of claim 20, further comprising:
controlling a display unit of the computing device so as to simultaneously display an application currently executing on the computing device and an image characterizing the muscle activity-command mapping,
wherein the application currently executing on the computing device is displayed in a first screen area of the display unit, and the image characterizing the muscle activity-command mapping is displayed in a second screen area of the display unit.

26. The method of claim 20, further comprising:
detecting a first application currently executing on the computing device, the muscle activity-command mapping being a first muscle activity-command mapping corresponding to the first application;
controlling a display unit of the computing device so as to display an image characterizing the first muscle activity-command mapping;
in response to a second application different from the first application being launched on the computing device, remapping the muscle activity-command mapping such that the remapped muscle activity-command mapping is a second muscle activity-command mapping corresponding to the second application, the second muscle activity-command mapping different from the first muscle activity-command mapping; and
controlling the display unit so as to update the displayed image such that the displayed image characterizes the second muscle activity-command mapping.

27. A method comprising:
(a) activating a brain-computer interface (BCI) through which a computing device is in operative communication with a brain of a user;
(b) defining a thought-command mapping according to which operation of the computing device is configured to be controlled through the BCI based on at least one brain signal of the user measured via one or more brain sensors coupled to the brain of the user, the thought-command mapping defining a plurality of thought variants each of which corresponding a command executable by the computing device, a first thought variant among the plurality of thought variants corresponding to a first command executable by the computing device;
(c) detecting an operation context of the computing device during operation of the computing device;
(d) remapping the thought-command mapping based on the detected operation context during operation of the computing device such that the first thought variant corresponds to a second command executable by the computing device different from the first command,
wherein, in response to the remapping of the thought-command mapping, the operation of the computing device is configured to be controlled through the BCI based on the at least one measured brain signal according to the remapped thought-command mapping;
(e) detecting a first application currently executing on the computing device, the thought-command mapping being a first thought-command mapping corresponding to the first application; and
(f) in response to a detection of a user action performed in the first application, remapping the thought-command mapping such that the remapped thought-command mapping is a second thought-command mapping based on the detected user action, the second thought-command mapping different from the first thought-command mapping.

28. A method comprising:
(a) activating a brain-computer interface (BCI) through which a computing device is in operative communication with a brain of a user;
(b) defining a thought-command mapping according to which operation of the computing device is configured to be controlled through the BCI based on at least one brain signal of the user measured via one or more brain sensors coupled to the brain of the user, the thought-command mapping defining a plurality of thought variants each of which corresponding a command executable by the computing device, a first thought variant among the plurality of thought variants corresponding to a first command executable by the computing device;
(c) detecting an operation context of the computing device during operation of the computing device;
(d) remapping the thought-command mapping based on the detected operation context during operation of the computing device such that the first thought variant corresponds to a second command executable by the computing device different from the first command,
wherein, in response to the remapping of the thought-command mapping, the operation of the computing device is configured to be controlled through the BCI based on the at least one measured brain signal according to the remapped thought-command mapping;
(e) detecting a first application currently executing on the computing device, the thought-command mapping being a first thought-command mapping corresponding to the first application; and (f) in response to a detection of an external event occurring during the execution of the first application, remapping the thought-command mapping such that the remapped thought-command mapping is a second thought-command mapping based on the detected external event, the second thought-command mapping different from the first thought-command mapping.

29. The method of claim 28, wherein the external event is detected when the computing device receive an incoming electronic message.

30. The method of claim 28, wherein the external event is detected when the computing device detects a change of a location of the user.

31. A method comprising:

(a) activating a brain-computer interface (BCI) through which a computing device is in operative communication with a brain of a user;

(b) defining a thought-command mapping according to which operation of the computing device is configured to be controlled through the BCI based on at least one brain signal of the user measured via one or more brain sensors coupled to the brain of the user, the thought-command mapping defining a plurality of thought variants each of which corresponding a command executable by the computing device, a first thought variant among the plurality of thought variants corresponding to a first command executable by the computing device;

(c) detecting an operation context of the computing device during operation of the computing device;

(d) remapping the thought-command mapping based on the detected operation context during operation of the computing device such that the first thought variant corresponds to a second command executable by the computing device different from the first command, wherein, in response to the remapping of the thought-command mapping, the operation of the computing device is configured to be controlled through the BCI based on the at least one measured brain signal according to the remapped thought-command mapping; and (e) in response to a detection of a user history associated with the first application, remapping the thought-command mapping such that the remapped thought-command mapping is a second thought-command mapping based on the detected user history, the second thought-command mapping different from the first thought-command mapping.

32. The method of claim 31, wherein the user history is associated with at least one of contacts of the user, previously used words or phrases, and previously executed commands.

33. A method comprising:

(a) activating a brain-computer interface (BCI) through which a computing device is in operative communication with a brain of a user;

(b) defining a thought-command mapping according to which operation of the computing device is configured to be controlled through the BCI based on at least one brain signal of the user measured via one or more brain sensors coupled to the brain of the user, the thought-command mapping defining a plurality of thought variants each of which corresponding a command executable by the computing device, a first thought variant among the plurality of thought variants corresponding to a first command executable by the computing device;

(c) detecting an operation context of the computing device during operation of the computing device;

(d) remapping the thought-command mapping based on the detected operation context during operation of the computing device such that the first thought variant corresponds to a second command executable by the computing device different from the first command, wherein, in response to the remapping of the thought-command mapping, the operation of the computing device is configured to be controlled through the BCI based on the at least one measured brain signal according to the remapped thought-command mapping; and (e) controlling a display unit of the computing device so as to simultaneously display an application currently executing on the computing device and an image characterizing the thought-command mapping, wherein the application currently executing on the computing device is displayed in a first screen area of the display unit, and the image characterizing the thought-command mapping is displayed in a second screen area of the display unit.

34. The method of claim 33, wherein the image characterizing the thought-command mapping indicates each of the plurality of thought variants and each command executable by the computing device to which each of the plurality of thought variants corresponds.

35. The method of claim 33, wherein the image characterizing the thought-command mapping includes a grid showing a correspondence between the plurality of thought variants and each command executable by the computing device.

36. A method comprising:

(a) activating a brain-computer interface (BCI) through which a computing device is in operative communication with a brain of a user;

(b) defining a thought-command mapping according to which operation of the computing device is configured to be controlled through the BCI based on at least one brain signal of the user measured via one or more brain sensors coupled to the brain of the user, the thought-command mapping defining a plurality of thought variants each of which corresponding a command executable by the computing device, a first thought variant among the plurality of thought variants corresponding to a first command executable by the computing device;

(c) detecting an operation context of the computing device during operation of the computing device;

(d) remapping the thought-command mapping based on the detected operation context during operation of the computing device such that the first thought variant corresponds to a second command executable by the computing device different from the first command, wherein, in response to the remapping of the thought-command mapping, the operation of the computing device is configured to be controlled through the BCI based on the at least one measured brain signal according to the remapped thought-command mapping (e) detecting a first application currently executing on the computing device, the thought-command mapping being a first thought-command mapping corresponding to the first application;

(f) controlling a display unit of the computing device so as to display an image characterizing the first thought-command mapping;

(g) in response to a second application different from the first application being launched on the computing device, remapping the thought-command mapping such that the remapped thought-command mapping is a second thought-command mapping corresponding to the second application, the second thought-command mapping different from the first thought-command mapping; and (h) controlling the display unit so as to update the displayed image such that the displayed image characterizes the second thought-command mapping.

37. A method comprising:
(a) activating a muscle-computer interface (muCI) through which a computing device is in operative communication with one or more muscles of a user;
(b) defining a muscle activity-command mapping according to which operation of the computing device is configured to be controlled through the muCI based on at least one muscle signal of the user measured via one or more muscle sensors coupled to the one or more muscles of the user, the muscle activity-command mapping defining a plurality of muscle activity variants each of which corresponding a command executable by the computing device, a first muscle activity variant among the plurality of muscle activity variants corresponding to a first command executable by the computing device;
(c) detecting an operation context of the computing device during operation of the computing device;
(d) remapping the muscle activity-command mapping based on the detected operation context during operation of the computing device such that the first muscle activity variant corresponds to a second command executable by the computing device different from the first command,
wherein, in response to the remapping of the muscle activity-command mapping, the operation of the computing device is configured to be controlled through the muCI based on the at least one measured muscle signal according to the remapped muscle activity-command mapping;
(e) controlling a display unit of the computing device so as to simultaneously display an application currently executing on the computing device and an image characterizing the muscle activity-command mapping, wherein the application currently executing on the computing device is displayed in a first screen area of the display unit, and the image characterizing the muscle activity-command mapping is displayed in a second screen area of the display unit.

38. A method comprising:
(a) activating a muscle-computer interface (muCI) through which a computing device is in operative communication with one or more muscles of a user;
(b) defining a muscle activity-command mapping according to which operation of the computing device is configured to be controlled through the muCI based on at least one muscle signal of the user measured via one or more muscle sensors coupled to the one or more muscles of the user, the muscle activity-command mapping defining a plurality of muscle activity variants each of which corresponding a command executable by the computing device, a first muscle activity variant among the plurality of muscle activity variants corresponding to a first command executable by the computing device;
(c) detecting an operation context of the computing device during operation of the computing device;
(d) remapping the muscle activity-command mapping based on the detected operation context during operation of the computing device such that the first muscle activity variant corresponds to a second command executable by the computing device different from the first command,
wherein, in response to the remapping of the muscle activity-command mapping, the operation of the computing device is configured to be controlled through the muCI based on the at least one measured muscle signal according to the remapped muscle activity-command mapping;
(e) detecting a first application currently executing on the computing device, the muscle activity-command mapping being a first muscle activity-command mapping corresponding to the first application;
(f) controlling a display unit of the computing device so as to display an image characterizing the first muscle activity-command mapping;
(g) in response to a second application different from the first application being launched on the computing device, remapping the muscle activity-command mapping such that the remapped muscle activity-command mapping is a second muscle activity-command mapping corresponding to the second application, the second muscle activity-command mapping different from the first muscle activity-command mapping; and
(h) controlling the display unit so as to update the displayed image such that the displayed image characterizes the second muscle activity-command mapping.

* * * * *